Patented Apr. 25, 1933

1,905,225

UNITED STATES PATENT OFFICE

ADOLF HAWERLANDER, OF NEW YORK, N. Y., ASSIGNOR TO HALIZITE CORPORATION, OF NEW YORK, N. Y., A CORPORATION OF NEW YORK

ART OF COMPRESSED LAMINATED PRODUCTS

No Drawing. Original application filed March 13, 1929, Serial No. 346,811, and in Great Britain September 20, 1929. Divided and this application filed July 10, 1930. Serial No. 467,135.

The present invention relates to the art of compressed laminated products and more particularly to processes of producing compressed laminated products of a fibrous nature and to products thereof.

It is an object of the present invention to provide a process for producing compressed laminated products of a fibrous character which is so constituted that they resemble a solid block of a fibrous material.

It is another object of the invention to provide a process of producing compressed laminated products in which a sheet of veneer is provided on the top surface.

A further object of the invention is to provide a process of producing compressed laminated products of wood in which the body of the product is constituted of a fibrous mass bonded together by a binder of organic character.

It is also within the contemplation of the invention to provide an improved compressed laminated product having faces of veneer.

Other objects and advantages of the invention will become apparent from the following description:

My improved process of producing compressed laminated products can be carried out in any appropriate apparatus and under a variety of suitable conditions. Although it is possible to modify various factors to suit particular conditions, a general statement will now be made setting forth satisfactory and suitable ranges of ingredients of my improved compressed laminated product and of operation required in carrying out my process to produce a compressed product say, for example, about 18"×18". Fibrous material of suitable nature is first prepared by preferably loosening the fibers from each other. A mass of the fibrous material ranging from about 1000 grams to about 1200 grams is weighed out. This mass is then treated with about 50 c. c. to about 250 c. c. of a liquid fuming agent so as to soak the fibers fairly uniformly. A liquid binding material is then applied to the thus treated fibrous material in amount within a range from about 65 c. c. to about 150 c. c. The fibrous material now containing a fuming agent and a binding material is uniformly distributed in a mold or other suitable container having a bottom and top plate and appropriate vents for the escape of the fuming agent and other volatile products. After proper arrangements are made, the mold or the like is placed in a heated press, such as a heated hydraulic press, and is subjected to a temperature within a range from about 300° F. to about 400° F. and to a pressure of about 200 pounds per square inch to about 2000 pounds per square inch. The fibrous mass may be left in a suitable period of time extending from about several minutes to about fifteen minutes. Upon the expiration of this period the mold is withdrawn from the press and is preferably allowed to cool. After it has cooled the compressed mass is withdrawn as a relatively dense, strong and tough block which is durable and resistant to various atmospheric influences and is capable of being bonded between two sheets of veneer or covered with a top sheet as will be described hereinafter.

An illustrative example of my invention will now be given merely for the purposes of illustrating the invention and for the purpose of a better understanding of the invention by those skilled in the art.

About 1000 grams of saw-dust, wood-shavings or the like are spread upon a table and about 100 c. c. of gasoline are sprinkled evenly on the saw-dust, for example. The thus-wetted saw-dust is then treated with about 100 c. c. of a liquid binder whose composition will be given hereinafter. A steel mold 18"×18" having vents therein is then prepared for the reception of the saw-dust containing a fuming agent (gasoline in this instance) and a liquid binder material. The mold is closed and is placed in a heated hydraulic press. After the plunger has been brought into proper position, the temperature is increased to say about 400° F. This heat causes the fuming agent to permeate the entire mass of saw-dust and to escape through the vents in the mold. Upon completion of or during the fuming operation the plunger is moved so as to increase the pressure on the mass of saw-dust to say about 1500 pounds per square inch. The application of heat is no longer continued and the pressure is maintained for say approximately 15 minutes. After this period of time has elapsed the mold is withdrawn from the hydraulic press and is preferably allowed to cool to atmospheric temperature. Upon cooling the mold is then opened and the compressed product removed. This product may now be placed between two sheets of veneer which have been treated with gasoline and one or both sides of which have been covered with the liquid binder. The veneered product is now placed in the mold again and subjected to the operations in the hydraulic press as set forth hereinabove. Upon removing the mold and cooling the same, a stable, veneered or laminated compressed product of fibrous material is produced.

In case it is desired to produce the veneered product completely in one operation the following procedure may be employed. The sheets of veneer, for example, 18″×18″ are taken and are first coated with gasoline and then with my binder material. The sheets are left to dry for a short time and after they are relatively dry, one sheet is placed in the bottom of the mold, a fibrous block or a treated fibrous mass or the like is then placed on the bottom sheet, and finally the second sheet is put on top of the saw-dust or the like. The mold is then closed and subjected to the aforementioned operations. In this instance, a compressed veneered product is produced which has a high polish and lustre. This veneered product is suitable for many uses in the building and furniture industries as well as in other fields. By coloring the veneer or liquid binder, the finished product can be made to resemble natural woods, such as mahogany and the like.

My veneered product has been subjected to various tests. For instance, a piece of product was soaked in water for 60 to 90 days. The product was then removed from the water and placed on a heated radiator for several days. The water disappeared but the product was just as firm and strong as before the soaking with water. The same test piece was placed on a windowsill for several days but there was no change in appearance or strength. A similar test was performed with boiling water with similar results. Other compressed products now on the commercial market when subjected to the same tests disintegrated or lost their strength or even became useless.

The liquid phenolic condensation product referred to hereinbefore is preferably made by mixing approximately 1000 parts of resorcinol with about 1000 parts of formaldehyde solution. This mixture is then heated to about 30° C. To the heated mixture about 3 parts of sodium sulphate are gradually added. After this addition, the mixture is heated to about 75° C. The resultant liquid phenolic condensation product either in its heated condition or cooled may be used as a liquid binder.

It will be observed that I select a fuming agent which evaporates or fumes at a temperature lower than that at which the binder sets or hardens to firm solid condition so that the fuming agent permeates the entire mass and thence escapes therefrom before the binder hardens. In this manner the hardened or set binder provides a reliable and safe bond within various portions of the compressed product whereby a secure and stable article of commerce is produced. When water is present in the binder, as in the specific phenolic condensation binder, i. e. a liquid phenol-formaldehyde synthetic resin which I have mentioned heretofore, the water also evaporates before the binder hardens and evaporates in such a manner that no blisters, pockets, voids or the like are formed within the compressed product. This latter feature is important because in many of the prior art processes the formation of blisters and the like caused by evaporating water or a solvent made the resultant products practically useless or of very little value. By the use of my process this disadvantage is entirely overcome.

It will also be noted that the fibrous material which I can use in my process is by-product material from diverse industries in practically the same condition as it comes from these industries without the necessity of treating the by-product material chemically or physically. By the use of my process, consequently, I am able to dispense with expensive and extended operations which are necessary in the production of prior commercial products. In other words, the fibrous particles of saw-dust, wood-shavings, corn-stalks, bagasse, jute waste, excelsior and the like are used in the same state and condition as received as a by-product material in my process and are secured together by a surface bond of binder material between contracting surfaces.

When I use the term "vegetable fibres" in the specification or claims I intend to cover saw-dust, wood-shavings, excelsior waste, corn stalks, bagasse, jute fibers and others related fibers or fibers which have similar characteristics.

While I have given specific example of my improved process merely by way of illustration, it is to be understood that I am not to be confined to the exact steps nor the specific reagents given as they are to be regarded only as illustrative and typical. Various modifications may be made without departing from the nature of my invention as defined in the appended claims.

I claim:

1. The process of making compressed fibrous products which comprises applying a film of gasoline to the surface sheets of veneer, covering the thus treated sheets with a liquid binder constituted of a phenolic condensation product, interposing a fibrous mass between two of said sheets of veneer, subjecting said composite mass to a temperature of approximately 400° F. and applying pressure to said composite mass while in a heated condition to compress the mass to a stable condition and to effect in conjunction with said heat the hardening of said binder.

2. The process set forth in claim 1 in which the fibrous mass interposed between the top and bottom sheets of veneer is first treated with gasoline and with a liquid binder constituted of a phenolic condensation product.

In testimony whereof I have hereunto set my hand.

ADOLF HAWERLANDER.